Patented June 26, 1928.

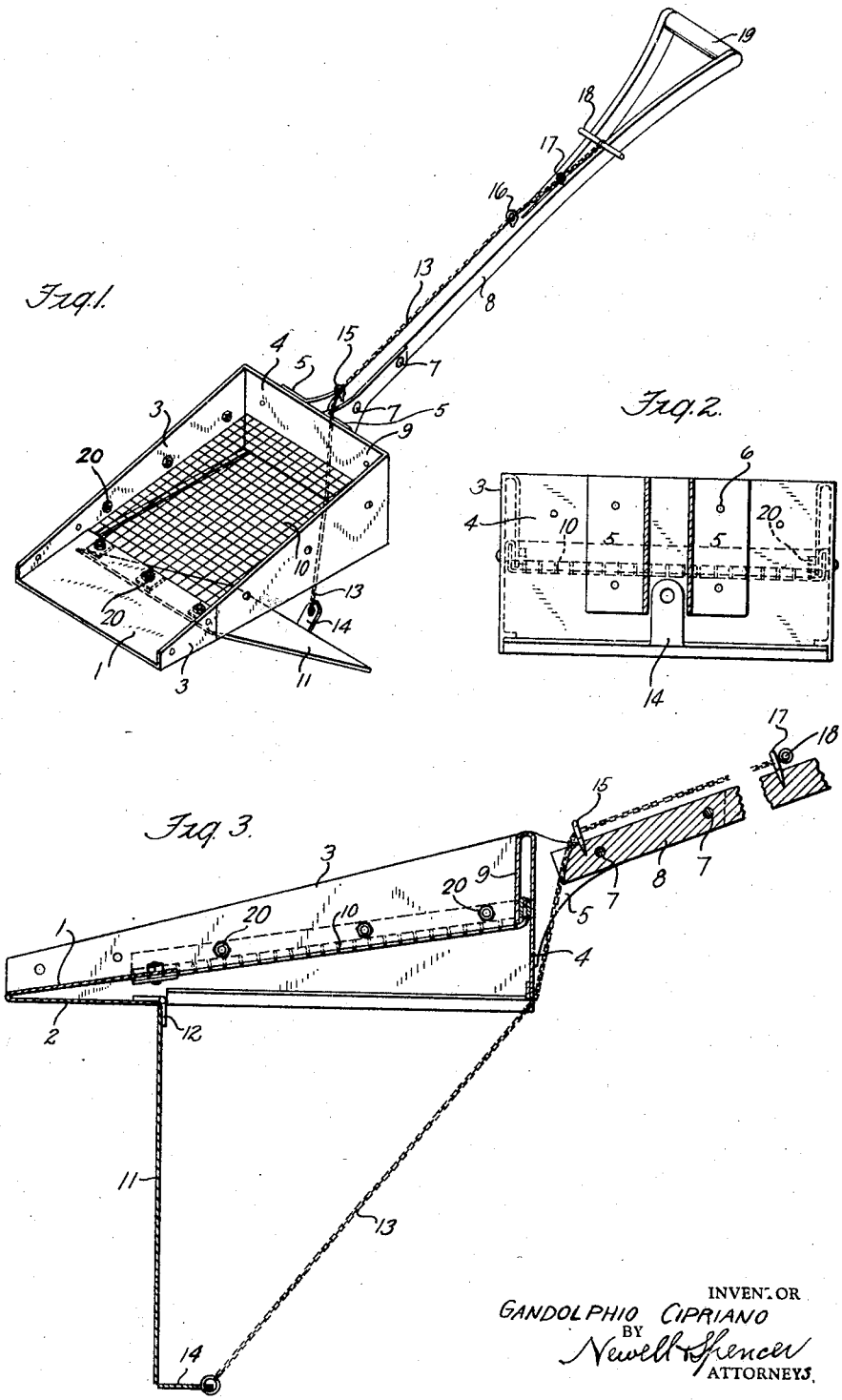

1,675,092

UNITED STATES PATENT OFFICE.

GANDOLFO CIPRIANO, OF DONGAN HILLS, NEW YORK.

SIFTER SHOVEL.

Application filed June 7, 1927. Serial No. 197,022.

The object of my invention is the provision of a sifter shovel which combines the advantages of simple and inexpensive construction with features which make it of great practical value in operation.

One feature of the invention resides in the provision of a shovel which may be used as a sifter for ashes, gravel, sand, coal and the like, and when used for ashes, for instance, it may be thrust into the ash pit as an ordinary shovel, but its shape and proportion to parts enables a quantity of ashes and cinders convenient for easy handling to be taken up. Sifting may be done within the ash pit if desired, the ashes passing through the meshes of the screen portion of the scoop. A hinged bottom enables the ashes to be dumped when and where desired and the cinders separately disposed of. An important feature of the invention resides in the fact that the hinge is at the forward end of the shovel so that during the scooping action there is a tendency to keep the bottom of the shovel closed. This is of practical advantage over devices with which I am familiar in which the hinged portion of a shovel has been arranged at the rear, resulting in the great disadvantage that when the shovel is thrust forward there is a tendency for cinders, ashes or other materials handled, to jam into the opening between the under part of the shovel and the end of the hinged member, thereby tending to open said member and prevent the shovel acting with the efficiency desired.

Various other features of the invention will become apparent by reference to the following description when taken in connection with the accompanying drawings, in which Figure 1 is a perspective view of the shovel;

Figure 2 is a section on line 3—3 of Figure 3; and

Figure 3 is a longitudinal sectional view.

Referring to the drawings, the shovel consists of a forward wedge-shaped portion having an upper element 1 and a lower element 2. These are suitably connected to wedge-shaped sides 3, joined by a back 4. Suitably secured, as by rivets 6, to this back, are angle plates 5 whose vertical portions are narrowed and receive bolts 7 for securing the handle 8 to the scoop portion of the shovel. The elements 1 and 2 may be formed integral, as shown, by bending a piece of galvanized iron or other suitable material, and extending from the element 1 is a screen 10 preferably made of galvanized iron wire of suitable mesh, which screen is secured to the element 1 and also to a bent-over portion 9 of the back 4. As shown, the elements 1 and 2 form an acute angle with each other. A bottom portion 11 is hinged at 12 to the element 2 and there is sufficient space provided between the screen 10 and the bottom 11 when said bottom is in closed position, to provide space for the ashes which pass through the screen. Normally the bottom is held in closed position by means of a chain 13, one end of which is attached to a finger 14 projecting upward from the hinged bottom 11 near the center thereof. This chain passes through screw eyes or other suitable guides 15, 16 and 17, secured to the handle of the shovel and the other end of the chain is provided with a small cross piece 18 or hand grip by which the bottom is held closed.

The imperforate element 1 extends for approximately one-third of the distance from the front to the back of the scoop portion of the shovel. This construction permits of taking up a sufficient quantity of material, and this proportion also provides that the amount which is taken up with each scooping action of the shovel can be conveniently handled.

The screen may be so fastened as by nutted bolts 20 that it may be readily taken out and a new screen or a screen of different sized mesh inserted, when desired.

The hinging of the bottom at the front portion of the shovel instead of at the side or back portion gives obvious advantages in handling and renders the implement much more efficient than in constructions heretofore known to me.

After a scoopful of ashes or other material to be sifted has been taken up by the shovel and the shovel given a sifting motion the cross piece 18 is released and the bottom drops to the position shown in Figures 1 or 3, as will be obvious.

The length of the chain 13 is preferably such that the hand grip 18 coincides with the handle cross piece 19 when the bottom is closed, thereby enabling the bottom to be held closed by the same hand which holds the shovel at its end.

What is claimed as new is:

1. A sifter shovel having an imperforate wedge-shaped forward portion including upper and lower elements, a perforated portion forming, substantially a continuation of said upper element, and a bottom hinged to said lower element and extending under the perforated portion.

2. A sifter shovel having imperforate sides and a wedge-shaped imperforate forward portion comprising upper and lower elements and a bottom hinged to said lower element.

3. A sifter shovel having a forward portion comprising upper and lower imperforate elements united at an acute angle, a bottom hinged to said lower element, and an open mesh member forming substantially a continuation of said upper element and of the length substantially two-thirds of the scoop portion of the shovel.

4. A sifter shovel having a handle and a scoop, the scoop comprisng an imperforate forward portion and a perforated portion to the rear thereof, a bottom hinged to the forward portion, a chain attached to said bottom, a hand grip at the end of the chain, said chain being of such length that the hand grip and end of the shovel handle coincide when the shovel bottom is closed.

5. A sifter shovel according to to claim 3, in which the open mesh member is so fastened that screens of different sized mesh may be inserted, as desired.

Signed at New York, New York, this 2nd day of June, 1927.

GANDOLFO CIPRIANO.